US008266178B2

(12) United States Patent
Uruma

(10) Patent No.: US 8,266,178 B2
(45) Date of Patent: Sep. 11, 2012

(54) MANAGEMENT APPARATUS, INFORMATION PROCESSING APPARATUS, AND METHOD THEREFOR

(75) Inventor: Shuichi Uruma, Kawaguchi (JP)

(73) Assignee: Canon Kabushiki Kaisha, Tokyo (JP)

( * ) Notice: Subject to any disclaimer, the term of this patent is extended or adjusted under 35 U.S.C. 154(b) by 113 days.

(21) Appl. No.: 12/875,970

(22) Filed: Sep. 3, 2010

(65) Prior Publication Data
US 2011/0066653 A1 Mar. 17, 2011

(30) Foreign Application Priority Data
Sep. 14, 2009 (JP) ................................ 2009-211351

(51) Int. Cl.
G06F 7/00 (2006.01)
G06F 17/30 (2006.01)
(52) U.S. Cl. ............................ 707/783; 707/821; 714/20
(58) Field of Classification Search .................. 707/783, 707/821, E17.005, E17.009, E17.019; 714/20, 714/E11.147; 358/1.14, 1.15, 1.16
See application file for complete search history.

(56) References Cited

U.S. PATENT DOCUMENTS

| 7,133,917 B2 * | 11/2006 | Re et al. ........................ 709/224 |
| 7,420,696 B2 * | 9/2008 | Nakagawa ................... 358/1.15 |
| 7,546,365 B2 * | 6/2009 | Torii ............................. 709/224 |
| 7,636,174 B2 * | 12/2009 | Fukuda ........................ 358/1.15 |
| 2003/0046135 A1 * | 3/2003 | Cartwright et al. ............... 705/8 |
| 2003/0195917 A1 * | 10/2003 | Horiyama et al. ............ 709/203 |
| 2007/0050425 A1 * | 3/2007 | Ichikawa et al. .............. 707/201 |
| 2007/0103715 A1 * | 5/2007 | Nakata ......................... 358/1.14 |
| 2008/0120340 A1 * | 5/2008 | Hashimoto ................. 707/104.1 |
| 2009/0240740 A1 * | 9/2009 | Ohsawa ......................... 707/200 |
| 2010/0132022 A1 * | 5/2010 | Venkatasubramanian ........ 726/7 |
| 2010/0253967 A1 * | 10/2010 | Privault et al. ............... 358/1.15 |
| 2011/0066653 A1 * | 3/2011 | Uruma .......................... 707/783 |
| 2011/0286035 A1 * | 11/2011 | Uruma ......................... 358/1.15 |

FOREIGN PATENT DOCUMENTS
JP 2006-302170 A 11/2006

OTHER PUBLICATIONS

Robert F. Erbacher, Kenneth L. Walker and Deborah A. Frincke—"Intrusion and misuse detection in large-scale systems"—Computer Graphics and Applications, IEEE, Jan./Feb. 2002, vol. 22, Issue: 1, pp. 38-47.*
Graeme Rocher and Jeff Brown—"Integrating Grails"—The Definitive Guide to Grails, 2009, (pp. 305-365).*

* cited by examiner

Primary Examiner — Anh Ly
(74) Attorney, Agent, or Firm — Canon USA, Inc., IP Division

(57) ABSTRACT

A management apparatus to manage log information related to a process in a first information processing apparatus and a second information processing apparatus operating in cooperation with each other. The management apparatus includes a reception unit to receive first log information associated with a first user managed by the first information processing apparatus and to receive second log information associated with a second user managed by the second information processing apparatus from the first and second information processing apparatuses, respectively, which independently perform user management. The management apparatus also includes a log management unit to manage third log information. If the first user corresponds to the second user, then the third log information is generated by merging the first log information associated with the first user and the second log information.

9 Claims, 13 Drawing Sheets

FIG.2A

| USER IDS | PASSWORDS |
|----------|-----------|
| A | **** |
| B | **** |
| C | **** |

FIG.2B

| USER IDS | PASSWORDS |
|----------|-----------|
| a | **** |
| b | **** |
| c | **** |

FIG.3A

| TIMES | USERS | INFORMATION | DEVICE NAMES |
|---|---|---|---|
| 7:00:00 | A | FAX SENDING REQUEST | (1) |
| 9:00:00 | A | FAX SENDING REQUEST | (1) |
| 10:00:00 | C | FAX SENDING REQUEST | (1) |

FIG.3B

| TIMES | COOPERATION SOURCE USERS | COOPERATION SOURCE DEVICE NAMES | COOPERATION DESTINATION USERS | COOPERATION DESTINATION DEVICE NAMES |
|---|---|---|---|---|
| 7:00:00 | A | (1) | a | I |
| 9:00:00 | A | (1) | a | II |
| 10:00:00 | C | (1) | a | II |

FIG.3C

| TIMES | USERS | INFORMATION | DEVICE NAMES |
|---|---|---|---|
| 7:00:00 | a | FAX SENDING | I |
| 8:00:00 | b | FAX SENDING | I |

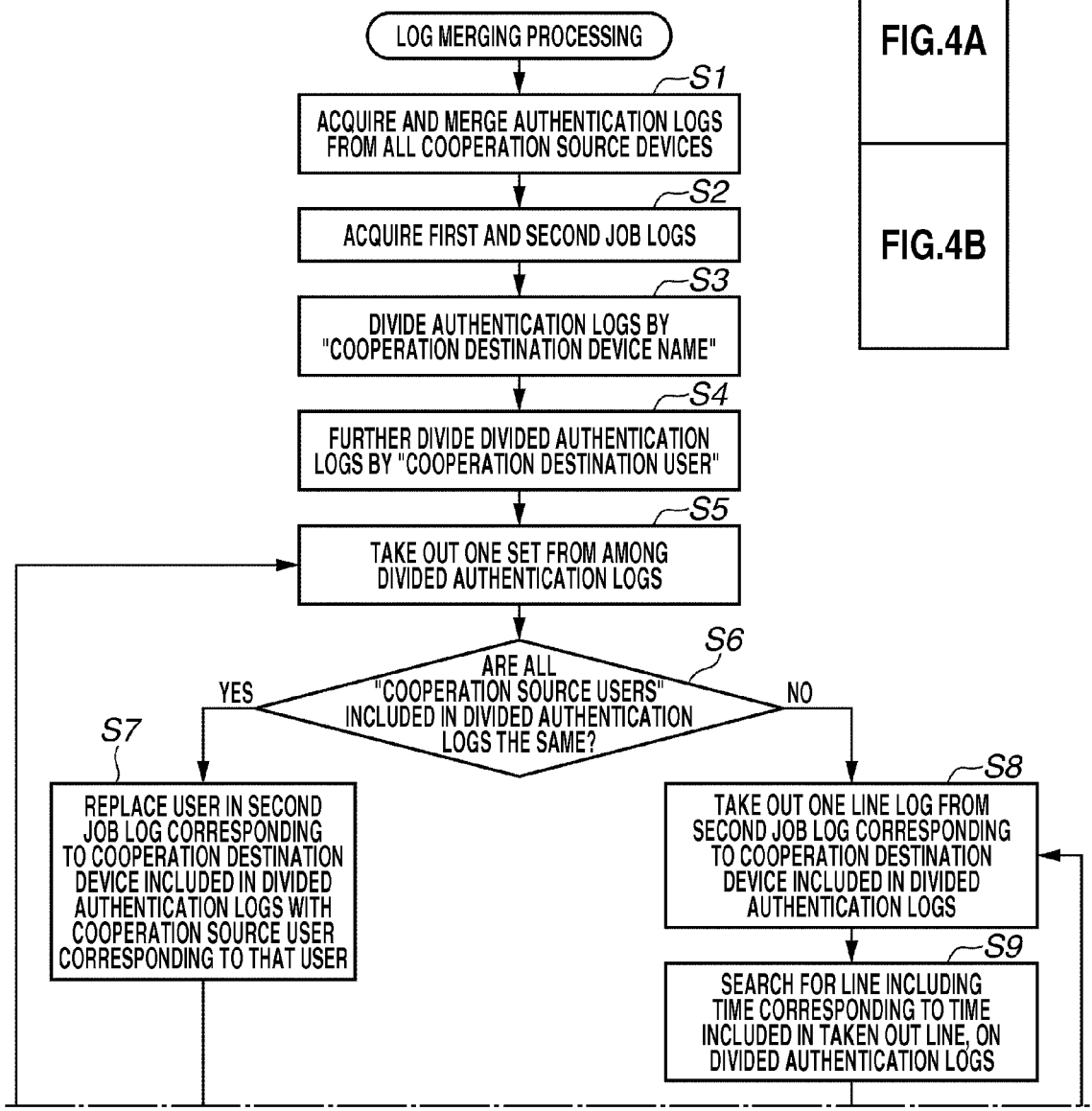

FIG.5A

| TIMES | COOPERATION SOURCE USERS | COOPERATION SOURCE DEVICE NAMES | COOPERATION DESTINATION USERS | COOPERATION DESTINATION DEVICE NAMES |
|---|---|---|---|---|
| 7:00:00 | A | (1) | a | I |
| 9:00:00 | A | (1) | a | II |
| 10:00:00 | C | (1) | a | II |

FIG.5B

| TIMES | COOPERATION SOURCE USERS | COOPERATION SOURCE DEVICE NAMES | COOPERATION DESTINATION USERS | COOPERATION DESTINATION DEVICE NAMES |
|---|---|---|---|---|
| 8:00:00 | B | (2) | b | I |
| 10:00:00 | D | (2) | a | II |

FIG.5C

| TIMES | COOPERATION SOURCE USERS | COOPERATION SOURCE DEVICE NAMES | COOPERATION DESTINATION USERS | COOPERATION DESTINATION DEVICE NAMES |
|---|---|---|---|---|
| 7:00:00 | A | (1) | a | I |
| 9:00:00 | A | (1) | a | II |
| 10:00:00 | C | (1) | a | II |
| 8:00:00 | B | (2) | b | I |
| 10:00:00 | D | (2) | a | II |

FIG.6A

| TIMES | COOPERATION SOURCE USERS | COOPERATION SOURCE DEVICE NAMES | COOPERATION DESTINATION USERS | COOPERATION DESTINATION DEVICE NAMES |
|---|---|---|---|---|
| 7:00:00 | A | (1) | a | Ⅰ |
| 9:00:00 | A | (1) | a | Ⅱ |
| 9:00:00 | A | (2) | b | Ⅰ |
| 10:00:00 | C | (1) | a | Ⅱ |
| 8:00:00 | B | (2) | b | Ⅰ |
| 10:00:00 | D | (2) | a | Ⅱ |

FIG.6B

| TIMES | COOPERATION SOURCE USERS | COOPERATION SOURCE DEVICE NAMES | COOPERATION DESTINATION USERS | COOPERATION DESTINATION DEVICE NAMES |
|---|---|---|---|---|
| 7:00:00 | A | (1) | a | Ⅰ |
| 8:00:00 | B | (2) | b | Ⅰ |
| 9:00:00 | A | (2) | b | Ⅰ |

FIG.6C

| TIMES | COOPERATION SOURCE USERS | COOPERATION SOURCE DEVICE NAMES | COOPERATION DESTINATION USERS | COOPERATION DESTINATION DEVICE NAMES |
|---|---|---|---|---|
| 9:00:00 | A | (1) | a | Ⅱ |
| 10:00:00 | C | (1) | a | Ⅱ |
| 10:00:00 | D | (2) | a | Ⅱ |

FIG.7A

| TIMES | COOPERATION SOURCE USERS | COOPERATION SOURCE DEVICE NAMES | COOPERATION DESTINATION USERS | COOPERATION DESTINATION DEVICE NAMES |
|---|---|---|---|---|
| 7:00:00 | A | (1) | a | I |
| 8:00:00 | B | (2) | b | I |
| 9:00:00 | A | (2) | b | I |

FIG.7B

| TIMES | COOPERATION SOURCE USERS | COOPERATION SOURCE DEVICE NAMES | COOPERATION DESTINATION USERS | COOPERATION DESTINATION DEVICE NAMES |
|---|---|---|---|---|
| 7:00:00 | A | (1) | a | I |

FIG.7C

| TIMES | COOPERATION SOURCE USERS | COOPERATION SOURCE DEVICE NAMES | COOPERATION DESTINATION USERS | COOPERATION DESTINATION DEVICE NAMES |
|---|---|---|---|---|
| 8:00:00 | B | (2) | b | I |
| 9:00:00 | A | (2) | b | I |

FIG.8A

| TIMES | USERS | INFORMATION | DEVICE NAMES |
|---|---|---|---|
| 8:00:00 | b | FAX SENDING | I |
| 9:00:00 | b | FAX SENDING | I |

FIG.8B

| TIMES | COOPERATION SOURCE USERS | COOPERATION SOURCE DEVICE NAMES | COOPERATION DESTINATION USERS | COOPERATION DESTINATION DEVICE NAMES |
|---|---|---|---|---|
| 8:00:00 | B | (2) | b | I |
| 9:00:00 | B | (2) | b | I |

FIG.8C

| TIMES | USERS | INFORMATION | DEVICE NAMES |
|---|---|---|---|
| 8:00:00 | B | FAX SENDING | I |
| 9:00:00 | B | FAX SENDING | I |

FIG.9A

| TIMES | USERS | INFORMATION | DEVICE NAMES |
|---|---|---|---|
| 9:00:00 | a | FAX SENDING (from(1)) | II |
| 10:00:00 | a | FAX SENDING (from(1)) | II |
| 10:00:00 | a | FAX SENDING (from(2)) | II |

FIG.9B

| TIMES | COOPERATION SOURCE USERS | COOPERATION SOURCE DEVICE NAMES | COOPERATION DESTINATION USERS | COOPERATION DESTINATION DEVICE NAMES |
|---|---|---|---|---|
| 9:00:00 | A | (1) | a | II |
| 10:00:00 | C | (1) | a | II |
| 10:00:00 | D | (2) | a | II |

FIG.9C

| TIMES | USERS | INFORMATION | DEVICE NAMES |
|---|---|---|---|
| 9:00:00 | A | FAX SENDING (from(1)) | II |
| 10:00:00 | C | FAX SENDING (from(1)) | II |
| 10:00:00 | D | FAX SENDING (from(2)) | II |

FIG.10A

| TIMES | USERS | INFORMATION | DEVICE NAMES |
|---|---|---|---|
| 7:00:00 | A | FAX SENDING REQUEST | (1) |
| 10:00:00 | A | FAX SENDING REQUEST | (1) |

FIG.10B

| TIMES | USERS | INFORMATION | DEVICE NAMES |
|---|---|---|---|
| 8:00:00 | B | FAX SENDING REQUEST | (2) |
| 10:00:00 | C | FAX SENDING REQUEST | (2) |

FIG.10C

| TIMES | USERS | INFORMATION | DEVICE NAMES |
|---|---|---|---|
| 7:00:00 | A | FAX SENDING | I |
| 8:00:00 | B | FAX SENDING | I |

FIG.10D

| TIMES | USERS | INFORMATION | DEVICE NAMES |
|---|---|---|---|
| 10:00:00 | A | FAX SENDING (from(1)) | II |
| 10:00:00 | C | FAX SENDING (from(2)) | II |

FIG.10E

| TIMES | USERS | INFORMATION | DEVICE NAMES |
|---|---|---|---|
| 7:00:00 | A | FAX SENDING REQUEST | (1) |
| 7:00:00 | A | FAX SENDING | I |
| 8:00:00 | B | FAX SENDING REQUEST | (2) |
| 8:00:00 | B | FAX SENDING | I |
| 10:00:00 | A | FAX SENDING REQUEST | (1) |
| 10:00:00 | A | FAX SENDING (from(1)) | II |
| 10:00:00 | C | FAX SENDING REQUEST | (2) |
| 10:00:00 | C | FAX SENDING (from(2)) | II |

MANAGEMENT APPARATUS, INFORMATION PROCESSING APPARATUS, AND METHOD THEREFOR

BACKGROUND OF THE INVENTION

1. Field of the Invention

The present invention relates to a management apparatus for managing log information, an information processing apparatus, and a method therefor.

2. Description of the Related Art

If a system including a plurality of devices (computers) is operated, it is necessary to collectively monitor a plurality of logs of devices, not merely a log of one device, in the system. In order to grasp what operation/processing has been executed with respect to a particular user or a particular action (e.g., a service utilized), a task to extract a log relating to the user or the action that becomes a search target from a large number of log files is needed. In order to extract the above-described log, it is required to identify by which of user's actions information recorded as a log (log information) by the device is output. In addition, in a case where a user makes a processing request and a plurality of devices realize the processing request in cooperation with each other, logs of the devices need to be associated with the action of the same user. Japanese Patent Application Laid-Open No. 2006-302170 discusses a log management apparatus that restores a list of user accounts of the past by using a change history of the user account list and a list of the latest user accounts, and performs log search using the list of user accounts that are valid for a search target period of time.

However, the log management apparatus discussed in Japanese Patent Application Laid-Open No. 2006-302170 needs to use only single user account list in the system. Therefore, if a plurality of devices that independently perform user management exist within the system, the log management apparatus cannot be applied. In the log management apparatus discussed in Japanese Patent Application Laid-Open No. 2006-302170, the system cannot be expanded by adding a device that performs its own user management, for example, to a system in which service is already running. As a result, if a plurality of devices that independently perform user management exist in the system, the log information cannot be extracted with respect to a particular user.

SUMMARY OF THE INVENTION

The present invention is directed to a management apparatus, an information processing apparatus, a log information management method, and a storage medium. These are capable of generating log information. If a plurality of devices that independently perform user management exist in a system, then the log information can be extracted with respect to a particular user.

According to an aspect of the present invention, a management apparatus may manage log information related to a process in a first information processing apparatus and a second information processing apparatus operating in cooperation with each other. The management apparatus includes a reception unit to receive first log information associated with a first user managed by the first information processing apparatus and to receive second log information associated with a second user managed by the second information processing apparatus from the first and second information processing apparatuses, respectively, which independently perform user management. The management apparatus also includes a log management unit to manage third log information. If the first user corresponds to the second user, then the third log information is generated by merging the first log information associated with the first user and the second log information.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 2A and 2B illustrate examples of user account lists.

FIGS. 3A to 3C illustrate examples of job logs and authentication logs.

FIGS. 5A to 5C illustrate log merging processing.

FIGS. 6A to 6C illustrate an example of division processing of authentication logs.

FIGS. 7A to 7C illustrate an example of division processing of authentication logs.

FIGS. 8A to 8C illustrate replacement processing of users.

FIGS. 9A to 9C illustrate replacement processing of users.

FIGS. 10A to 10E illustrate merge processing of job logs.

DESCRIPTION OF THE EMBODIMENTS

Various exemplary embodiments, features, and aspects of the invention will be described in detail below with reference to the drawings.

Figure 1:
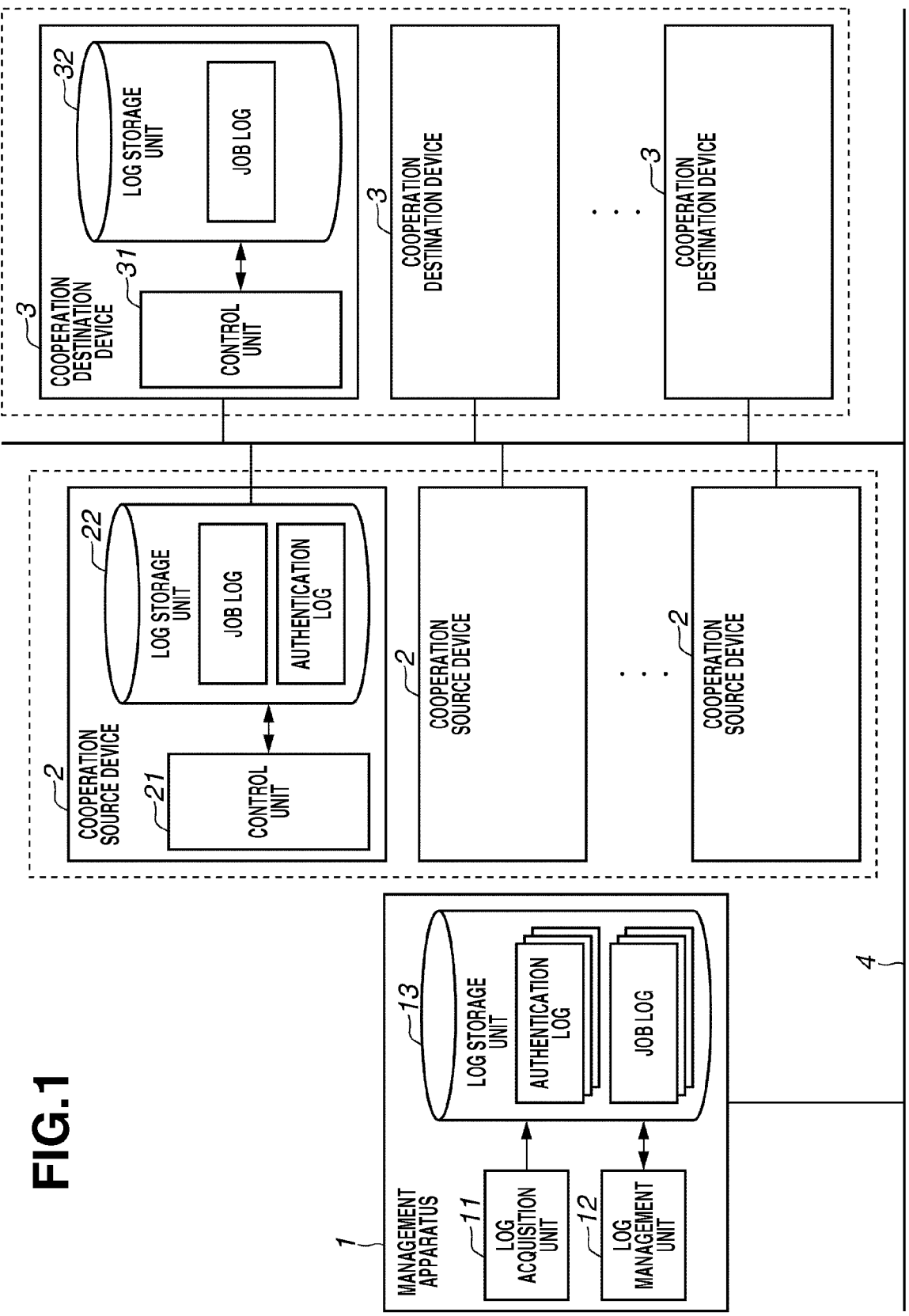
FIG. 1 illustrates a system configuration example according to an exemplary embodiment of the present invention.

FIG. 1 illustrates an example of a system configuration according to an exemplary embodiment of the present invention. The system illustrated in FIG. 1 includes a management apparatus 1, one or a plurality of cooperation source devices 2, and one or a plurality of cooperation destination devices 3. The management apparatus 1, the cooperation source devices 2, and the cooperation destination devices 3 are connected to one another via a network 4 such as a local area network (LAN). The management apparatus 1 manages log information output from the cooperation source devices 2 and the cooperation destination devices 3. The management apparatus 1 is a computer such as, for example, a personal computer (PC). The cooperation source devices 2 and the cooperation destination devices 3 are first information processing apparatuses and second information processing apparatuses, respectively, each performing independently user management. The cooperation source devices 2 and the cooperation destination devices 3 are, for example, multifunction peripherals (MFPs).

The cooperation source device 2 includes a control unit 21 and a log storage unit 22. The cooperation destination device 3 includes a control unit 31 and a log storage unit 32. The cooperation source device 2 and the cooperation destination device 3 operate in cooperation with each other. For example, when a user makes an execution request of processing, first, the control unit 21 of the cooperation source device 2 receives the above-described execution request of processing. The control unit 21 makes an execution request of processing to the control unit 31 of the cooperation destination device 3. Then, the control unit 31 of the cooperation destination device 3, which has received the execution request of processing, executes final processing. For example, the control unit 21 of the cooperation source device 2 makes a FAX sending request to the cooperation destination device 3, and the control unit 31 of the cooperation destination device 3, which has received the FAX sending request, performs the FAX sending. The control unit 21 of the cooperation source device 2 and the control unit 31 of the cooperation destination device 3 generate job logs as log information relating to the above-described execution of processing. The control unit 21 generates a first job log as first log information, and the control unit 31 generates a second job log as second log information. The control unit 21 stores the generated first job log in the log storage unit 22, and the control unit 31 stores the generated second job log in the log storage unit 32. In addition, the control unit 21 and the control unit 31 send the first job log and the second job log to a log management unit 12 of the management apparatus 1, respectively. The correspondence between the cooperation source device 2 and the cooperation destination device 3 that operate in cooperation with each other is not fixed. Arbitrary information processing apparatuses, as long as they operate in cooperation with each other as described above, can be applied as the cooperation source device 2 and the cooperation destination device 3.

A user who uses the cooperation source device 2 or the cooperation destination device 3 needs to be subjected to a user authentication in advance of the use of each of the devices. For example, the control unit 21 of the cooperation source device 2 and the control unit 31 of the cooperation destination device 3 perform user authentication using user account lists containing user IDs and passwords, as illustrated in FIGS. 2A and 2B, respectively. The user IDs contained in the user account list illustrated in FIG. 2A are identification information of users (first users) managed by the cooperation source device 2. The user IDs contained in the user account list illustrated in FIG. 2B are identification information of the users (second user) managed by the cooperation destination device 3. The user account list is stored in an authentication server in the inside or outside of the device. Each device performs user management under a user system different from each other. Therefore, the user IDs in the user account list which the cooperation source device 2 uses, and the user IDs in the user account list which the cooperation destination device 3 uses, are not in one-to-one correspondence. The control unit 21 of the cooperation source device 2 performs user authentication, when receiving a request from a user, and making an execution request of processing to the cooperation destination device 3. In addition, the control unit 21 requests the cooperation destination device 3 of an execution request destination of processing to perform user authentication, and receives a user authentication result from the cooperation destination device 3, which has performed user authentication in response to the request. The control unit 21 generates an authentication log based on the user authentication result in the cooperation source device 2 and the user authentication result received from the cooperation destination device 3, and stores it in the log storage unit 22. The authentication log is user authentication information indicating which of the first users managed by the cooperation source device 2 is authenticated as which of the second users by which of the cooperation destination devices 3.

The management apparatus 1 includes a log acquisition unit 11, a log management unit 12, and a log storage unit 13. The log acquisition unit 11 receives a first job log associated with a first user managed by the cooperation source device 2, from the control unit 21 of the cooperation source device 2. Further, the log acquisition unit 11 receives a second job log associated with a second user managed by the cooperation destination device 3, from the cooperation destination device 3. Yet further, the log acquisition unit 11 receives authentication logs from respective cooperation source devices 2. The log acquisition unit 11 stores the received first and second job logs and the authentication logs in the log storage unit 13. The log management unit 12 determines a first user corresponding to (who is the same person as) a second user managed by the cooperation destination device 3. The log management unit 12 extracts from the log storage unit 13 the second job log received from the cooperation destination device 3. The log management unit 12 replaces the second user associated with the extracted second job log with the first user corresponding to the second user, and subsequently merges the second job log and the first job log stored in the log storage unit 13 (performs log merging processing). With this log merging processing, the log management unit 12 generates a new job log (a third job log) associated with the first user, and stores the generated new job log in the log storage unit 13.

According to the exemplary embodiment of the present invention, the log management unit 12, based on an authentication log which the log acquisition unit 11 has received, determines a first user corresponding to a second user managed by the cooperation destination device 3, included in the authentication log. More specifically, the log management unit 12 merges the authentication logs which the log acquisition unit 11 has received, divides the merged authentication logs by each of the first users included in the authentication logs and each of the cooperation destination devices (each of the second information processing apparatuses), and generates divided authentication logs. The divided authentication logs refer to divided user authentication information, in which the user authentication information is divided. The log management unit 12, based on a correspondence relationship between the first users and the second users included in the generated divided authentication logs, determines first users corresponding to second users managed by the cooperation destination device 3 associated with the divided authentication logs. For example, the log management unit 12 determines whether the first user and the second user included in the divided authentication logs are in one-to-one correspondence. If the first user and the second user are in one-to-one correspondence, the log management unit 12 determines that the first user being in one-to-one correspondence with the second user is to be the first user corresponding to the second user managed by the cooperation destination device 3, included in the divided authentication logs. The log management unit 12 can determine the first user corresponding to the second user using arbitrary information, for example, information other than the authentication log, indicating which of the first users is managed as which of the second users by which of the cooperation destination devices 3.

According to the exemplary embodiment of the present invention, the authentication log and the second job log contain time information associated with the first users and time information associated with the second users, respectively. Then, the log management unit 12, if the first user and the second user included in the divided authentication logs are not in one-to-one correspondence, performs the following processing. More specifically, the log management unit 12, based on time information contained in the divided authentication logs and time information contained in the second job log received from the cooperation destination device 3 corresponding to that divided authentication log, determines a first user corresponding to a second user managed by the cooperation destination device 3.

According to the exemplary embodiment of the present invention, the second job log contains identification information of the cooperation source device 2 of an execution request source of processing to the cooperation destination device 3. The log management unit 12 recognizes identification information of the cooperation source device 2 in the divided authentication logs and identification information of the cooperation source device 2 of an execution request source of processing in the second job log received from the cooperation destination device 3 in the divided authentication logs. Then, based on the recognized identification information, the log management unit 12 determines the first user corresponding to the second user managed by the cooperation destination device 3.

According to the exemplary embodiment of the present invention, the log management unit 12 requests the cooperation source device 2 and the cooperation destination device 3 to simultaneously execute processing for outputting the log information. Then, the log management unit 12, based on a difference between times contained in the log information which the cooperation source device 2 and the cooperation destination device 3 each have output, corrects time information contained in the authentication log, time information contained in the first job log, or time information contained in the second job log. In the log storage unit 13, the first, second job logs, and the authentication log are stored. The log storage unit 13 is, for example, a hard disk. A log information management method according to the present exemplary embodiment is realized by the functions of respective processing units included in the management apparatus 1 illustrated in FIG. 1. More specifically, a central processing unit (CPU) reads a log management program as a computer program for realizing the log management method according to the present exemplary embodiment from a storage unit such as a memory, and executes the read log management program.

FIGS. 3A to 3C illustrates examples of job logs and authentication logs. FIG. 3A illustrates a data configuration of first job logs which the cooperation source device 2 generates. The first job logs include data items such as times, users, information, and device names. The time is a time at which a user made an execution request of processing to the cooperation source device 2. The user is identification information (user ID) of a user who made an execution request of processing. The information indicates a content of processing performed in response to an execution request of processing. The device name is a name of the cooperation source device 2 which has output the first job log.

FIG. 3B illustrates a data configuration of authentication logs which the cooperation source device 2 outputs. In this example, there is illustrated an authentication log which is output as a result of a user authentication performed when the cooperation source device 2, upon receiving an execution request of processing from a user, makes a execution request of processing to the cooperation destination device 3. The authentication logs include data items such as, times, cooperation source users, cooperation source device names, cooperation destination users, and cooperation destination device names. The time is a time at which a user received a user authentication. The cooperation source user is a user ID in the cooperation source device 2 of a user who intends to be authenticated, namely, a user ID of the first user managed by that cooperation source device 2. The cooperation destination device name is a name (identification information) of the cooperation source device 2 that performs output of the authentication log. The cooperation destination user is a user ID to be used when a user is authenticated in the cooperation destination device 3, namely, a user ID of the first user managed by the cooperation destination device 3. The cooperation destination device name is a name (identification information) of the cooperation destination device 3 that becomes an execution request destination of processing. For example, the first record (data on the first line) of the authentication logs illustrated in FIG. 3B indicates that at 7:00 AM, the user "A" of the cooperation source device "(1)" was authenticated as the user "a" by the cooperation destination device "I".

FIG. 3C illustrates a data configuration of the second job logs which the cooperation destination device 3 outputs. The second job logs include data items such as times, users, information, and device names. The time is a time at which a user made an execution request of processing. The user is identification information (user ID) of a user who made an execution request of processing. The information indicates a content of the processing performed in response to the execution request of the processing. The device name is a name (identification information) of the cooperation destination device 3 that has output the second job log.

Figure 4B:
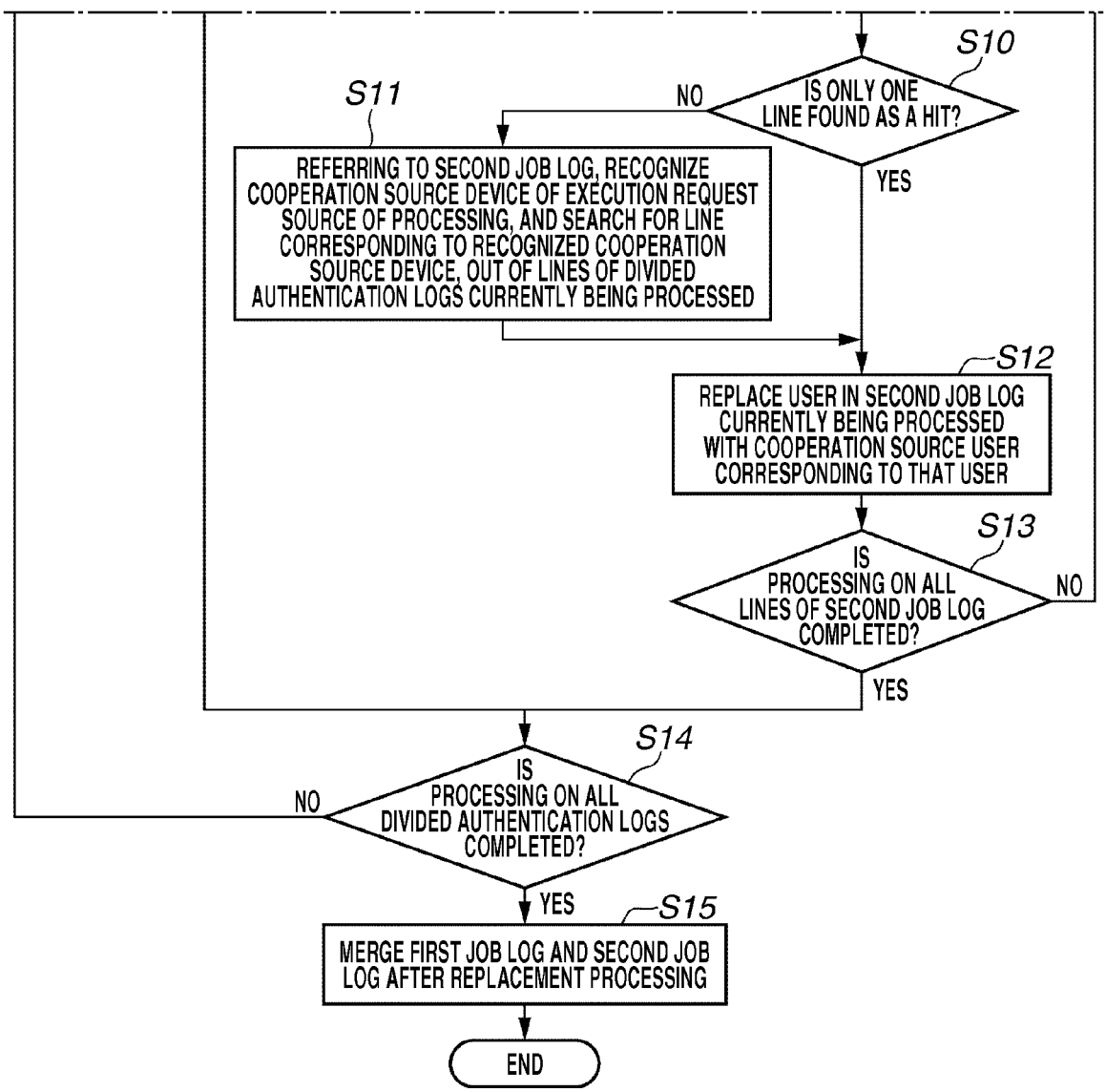
FIG. 4, composed of FIGS. 4A and 4B, illustrates an example of a log management processing flow according to an exemplary embodiment of the present invention.

FIG. 4, composed of FIGS. 4A and 4B, illustrates an example of the log management processing flow according to the present exemplary embodiment. An administrator performs a start operation of the log merging processing on a log management program stored in a memory of the management apparatus 1, so that the log merging processing is started. First, in step S1, the log acquisition unit 11 of the management apparatus 1 acquires authentication logs from all of the cooperation source devices 2 connected with the network 4, then the log management unit 12 merges and stores the acquired authentication logs in the log storage unit 13. FIGS. 5A to 5C illustrate the log merging processing in step S1. The log management unit 12 merges the authentication logs output from the cooperation source device "(1)" illustrated in FIG. 5A, and the authentication logs output from the cooperation source device "(2)" illustrated in FIG. 5B. As a result of the log merging processing, the authentication logs after the log merging processing as illustrated in FIG. 5C are generated. When the log merging processing is performed in step S1, the log management unit 12 executes time correction processing described below. The time correction processing is processing for resolving a lag of times contained in the logs (authentication logs or job logs), due to a lag of clocks of the cooperation source device 2 and the cooperation destination device 3.

Next, in step S2, the log acquisition unit 11 acquires the first job logs that all of the cooperation source devices 2 connected with the network 4 have output, and the second job logs that all of the cooperation destination devices 3 have output. Then, the first and the second job logs acquired by the log management unit 12 are stored in the log storage unit 13, in a state where each remains to be independent. In step S2, the log acquisition unit 11 further performs time correction processing on the acquired first and second job logs. Next, in step S3, the log management unit 12 divides the authentication logs merged in step S1 described above by "cooperation destination device name". In step S4, the log management unit 12 further divides the divided authentication logs by "cooperation destination user". In steps S3 and S4, the divided authentication logs are generated in which the authentication logs are divided by each of the cooperation destination devices and each of the cooperation destination users.

FIGS. 6A to 6C illustrate an example of division processing of the authentication logs in step S3. The log acquisition unit 11 divides the authentication logs illustrated in FIG. 6A into the divided authentication logs corresponding to the cooperation destination device "I", illustrated in FIG. 6B, and the divided authentication logs corresponding to the cooperation destination device "II", illustrated in FIG. 6C.

FIGS. 7A to 7C illustrate an example of division processing of the authentication logs in step S4. The log acquisition unit 11 divides the authentication logs corresponding to the cooperation destination device "I", illustrated in FIG. 7A, into the divided authentication logs corresponding to the cooperation destination user "a", illustrated in FIG. 7B, and the divided authentication logs corresponding to the cooperation destination user "b", illustrated in FIG. 7C.

Next, in steps S5 to S14, the management apparatus 1 determines a first user corresponding to a second user managed by the cooperation destination device 3, included in the divided authentication logs, and replaces the second user in the second job logs acquired from the cooperation destination device 3, with the first user. More specifically, firstly, in step S5, the log management unit 12 of the management apparatus 1 takes out one set from among the divided authentication logs not yet processed. In step S6, the log management unit 12 determines whether all of "the cooperation source users" included in the divided authentication logs, which the log management unit 12 has taken out, are the same, namely, the cooperation destination user and the cooperation source user are in one-to-one correspondence. If the log management unit 12 determines that the cooperation source users included in the divided authentication logs are all the same (YES in step S6), the log management unit 12 performs processing described below. The log management unit 12 determines the cooperation source users, determined to be all the same, to be the cooperation destination users included in the divided authentication logs, namely, users corresponding to the second users managed by the cooperation destination device 3, included in the divided authentication logs, and the process proceeds to step S7. For example, assume that the divided authentication log which has been taken out is the divided authentication log illustrated in FIG. 7B. The log management unit 12 determines that the cooperation destination user "a" and the cooperation source user "A" contained in the divided authentication logs are in one-to-one correspondence, and determines the cooperation source user "A" to be a user corresponding to the cooperation destination user "a".

If the log management unit 12 determines that "the cooperation source users" included in the divided authentication log are not the same (NO in step S6), namely, the cooperation destination user and the cooperation source user are not in one-to-one correspondence, the process proceeds to step S8. For example, if the divided authentication logs which have been taken out are the divided authentication logs illustrated in FIG. 7C, the log management unit 12 determines that the cooperation destination user and the cooperation source user included in the divided authentication logs are not in one-to-one correspondence, and then in the process proceeds to step S8.

Next, in step S7, the log management unit 12 replaces a user in the second job log corresponding to the cooperation destination device 3 included in the divided authentication log, with the cooperation source user corresponding to that user.

For example, the log management unit 12 determines, as a result of determination processing performed in the above-described step S6 relating to the divided authentication logs illustrated in FIG. 8B, the cooperation source user "B" to be a user corresponding to the cooperation destination user "b". Therefore, in step S7, the log management unit 12 replaces the user "b" in the second job logs corresponding to the cooperation destination device "I", illustrated in FIG. 8A, with the user "B". FIG. 8C illustrates the second job logs corresponding to the cooperation destination device "I" after the above-described replacement.

In step S8, the log management unit 12 takes out one line log from the second job logs corresponding to the cooperation destination device 3 included in the divided authentication logs currently being processed. In step S9, the log management unit 12 searches for a line including a time corresponding to a time included in taken out line, on the divided authentication logs currently being processed. In step S9, the log management unit 12 may search for a line corresponding to the same time as a time included in the taken out line, on the divided authentication logs, or may search for a line corresponding to an old time within a predetermined time on the basis of a time included in the taken out line. Subsequently, in step S10, the log management unit 12 determines whether, as a search result, only one line is found as a hit on the divided authentication logs. If the log management unit 12 determines that only one line is found as a hit (YES in step S10), the log management unit 12 determines that the cooperation source user included in a hit line is to be a cooperation source user corresponding to a user within the second job log currently being processed. Then, in step S12, the log management unit 12 replaces a user within the second job log currently being processed with a cooperation source user corresponding to that user. For example, when the log management unit 12 performs search processing in the above-described step S9 based on data on the first line of the second job log illustrated in FIG. 9A and the divided authentication logs illustrated in FIG. 9B, the data on the first line of the divided authentication logs is found as a hit. Therefore, the log management unit 12 determines that the cooperation source user "A" contained in the data on the first line of the divided authentication logs, is to be the cooperation source user corresponding to the user "a" contained in the data on the first line of the second job logs illustrated in FIG. 9A. Therefore, the log management unit 12 replaces the user "a" contained in the data on the first line of the second job logs illustrated in FIG. 9A with the user "A".

In the above step S10, if the log management unit 12 determines that a plurality of lines is found as a hit on the divided authentication logs (NO in step S10), then in step S11, referring to content of "information" of the second job logs currently being processed, the log management unit 12 recognizes the cooperation source device of an execution request source of the processing, and searches for a line corresponding to the recognized cooperation source device, out of lines of the divided authentication logs currently being processed. In step S12, the log management unit 12 determines that a cooperation source user included in a line that is found as a hit is to be a cooperation source user corresponding to the user within the second job logs currently being processed, and then the process proceeds to step S13. For example, regarding the data on the second line of the second job logs illustrated in FIG. 9A, lines that are found as a hit on the divided authentication logs illustrated in FIG. 9B through the search processing are two lines, i.e., the second line and the third line, of the divided authentication logs. On the other hand, information "FAX sending (from (1))" contained in the data on the second line of the second job logs indicates that an execution request source of processing is the cooperation source device "(1)". Therefore, in the above step S12, the log management unit 12 takes the second line corresponding to the cooperation source device "(1)", out of lines included in the divided authentication logs illustrated in FIG. 9B, as a search result. The log management unit 12 determines that the cooperation source user "C" included in the searched second line is to be a cooperation source user corresponding to the user "a" included in the second line in FIG. 9A. Therefore, in step S12, the log management unit 12 replaces the user "a" contained in the data on the second line of the second job logs illustrated in FIG. 9A with the user "C".

Similarly, in step S12, regarding the data on the third line of the second job logs illustrated in FIG. 9A, the log management unit 12 takes the third line corresponding to the cooperation source device "(2)", out of lines included in the divided authentication logs illustrated in FIG. 9B, as a search result. The log management unit 12 determines that the cooperation source user "D" included in the searched third line is to be a cooperation source user corresponding to the user "a" included in the third line in FIG. 9A. Therefore, in step S12, the log management unit 12 replaces the user "a" contained in the data on the third line of the second job logs illustrated in FIG. 9A with the user "D".

Next, in step S13, the log management unit 12 determines whether processing on all lines of the second job logs is completed. If the log management unit 12 determines that there are some lines in which the processing is not completed (NO in step S13), the process returns to the above step S8. If the log management unit 12 determines that the processing is completed on all lines of the second job logs (YES in step S13), then in step S14, the log management unit 12 determines whether the processing on all of the divided authentication logs is completed. If the log management unit 12 determines that there is a divided authentication log in which the processing is not completed (NO in step S14), the process returns to the above step S5. If the log management unit 12 determines that the processing is completed on all of the divided authentication logs (YES in step S14), then in step S15, the log management unit 12 merges the first job logs acquired from the cooperation source device 2 and the second job logs after replacement processing in step S12. For example, the log management unit 12 merges the first job logs illustrated in FIGS. 10A and 10B and the second job logs after replacement processing illustrated in FIGS. 10C and 10D, thus generating a new job log as illustrated in FIG. 10E.

In the job log illustrated in FIG. 10E, the user IDs of the second users managed by the cooperation destination device 3 are unified into the user IDs of the first users managed by the cooperation source device 2. Therefore, with the management apparatus according to the present exemplary embodiment, with respect to the logs that are output under the system configuration made up of the devices each independently performing user management, the users recorded on the logs can be unified into the user system in which the users are managed by a single device. As a result, it becomes possible to generate log information that can be extracted with respect to a particular user.

Figure 11:
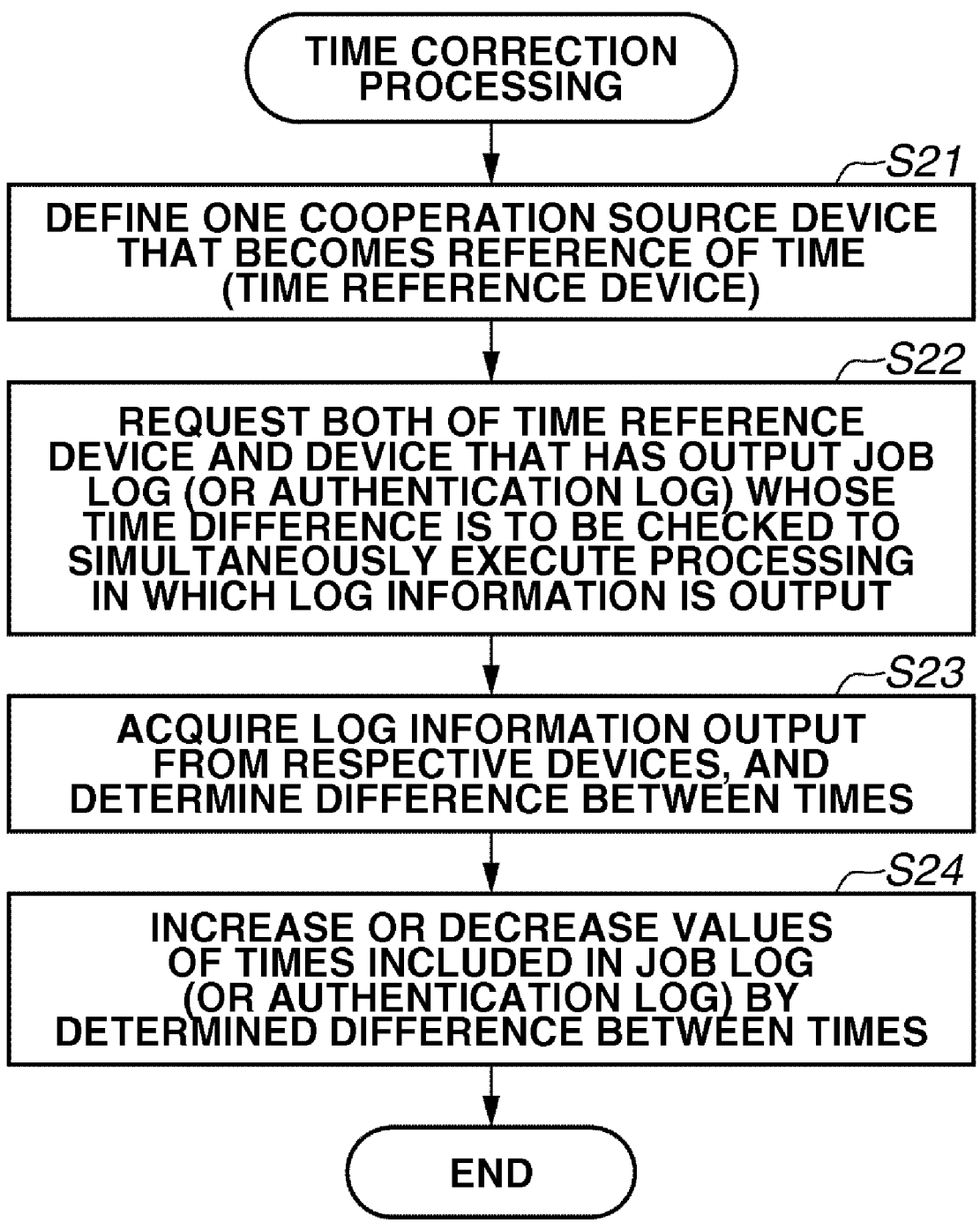
FIG. 11 illustrates an example of a time correction processing flow.

FIG. 11 illustrates an example of a time correction processing flow executed insteps S1 and S2 in FIG. 4. In steps S1 and S2 in FIG. 4, the log management unit 12 performs processing described below on lines of all logs on which time correction is to be made. Firstly, in step S21, the log management unit 12 defines one cooperation source device 2 that becomes a reference of time (hereinafter, described as a time reference device). If the authentication log illustrated in FIG. 5C is a target for time correction processing, the log management unit 12 defines, for example, the cooperation source device "(1)" as a time reference device. Next, in step S22, the log management unit 12 requests both of a time reference device and a device that has output a job log (or authentication log) whose time difference is to be checked to simultaneously execute processing in which log information is output. For example, if the authentication logs illustrated in FIG. 5C are a target for time correction processing, the log management unit 12 requests the cooperation source device "(1)" and the cooperation source device "(2)" to simultaneously execute the processing in which the log information is output. In response to the request, the respective devices output the log information. In step S23, the log management unit 12 acquires log information output from the respective devices via the log acquisition unit 11, and determines a difference between times contained in each of the log information. For example, the log management unit 12 determines a difference between a time (first time) contained in the log information acquired from the cooperation source device "(1)" and a time (second time) contained in the log information acquired from the cooperation source device "(2)". In step S24, the log management unit 12 increases or decreases values of time included in the job logs (or authentication log) by the difference between times determined in step S23. For example, the log management unit 12 increases or decreases, by the above-described difference between the first time and the second time, values of time included in lines corresponding to the cooperation source device "(2)", out of lines of the authentication logs illustrated in FIG. 5C.

Figure 12:
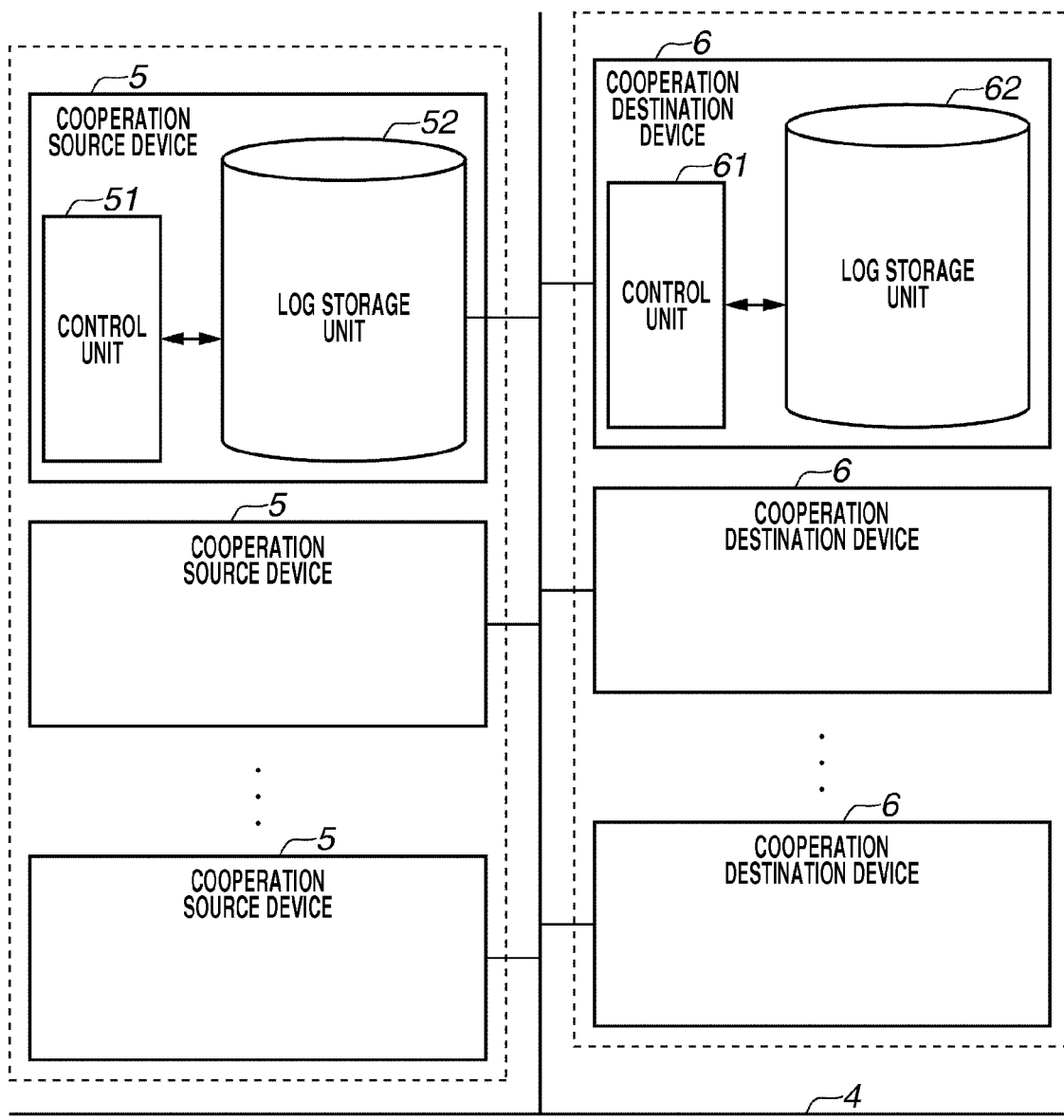
FIG. 12 illustrates an example of a system configuration according to another exemplary embodiment of the present invention.

FIG. 12 illustrates a system configuration example according to another exemplary embodiment of the present invention. A cooperation source device 5 provided in the system illustrated in FIG. 12 has the same function as the function which the above-described cooperation source device 2 and the management apparatus 1 illustrated in FIG. 1 have. Further, a cooperation destination device 6 has the same function as the function which the cooperation destination device 3 illustrated in FIG. 1 has. In the cooperation source device 5, a central processing unit (CPU) reads a log management program from a storage unit such as a memory, and executes the read log management program.

More specifically, the cooperation source device 5 is an information processing apparatus of the cooperation source that operates in cooperation with the cooperation destination device 6 that is an information processing apparatus of the cooperation destination, and performs user management independently of the cooperation destination device 6. A control unit 51, included in the cooperation destination device 6, acquires the first job logs associated with the first users managed by the cooperation source device 5 from respective cooperation source devices 5. The respective cooperation source devices 5 include the device itself and other cooperation source devices 5. The above-described first job logs are stored in the log storage unit 52 by the control unit 51 in the respective cooperation source devices 5. The control unit 51 acquires second job logs associated with the second users managed by the cooperation destination device 6 from a control unit 61 of the respective cooperation destination devices 6. The second job logs are stored in a log storage unit 62 by the control unit 61 in the respective cooperation destination devices 6. The control unit 51 determines first users corresponding to the second users managed by the cooperation destination devices 6. Then, the control unit 51 replaces the second users associated with the second log information acquired from the cooperation destination devices 6 with the first users corresponding to the second users, and merges the second job logs and the first job logs, thus generating a new job log associated with the first users. More specifically, the control unit 51 acquires authentication logs which the respective cooperation source devices 5 have output and stores them in the log storage unit 52. The control unit 51 performs the same processing as the above-described processing illustrated in FIG. 4 based on the acquired authentication logs, and determines the first users corresponding to the second users managed by the cooperation destination devices 6. With the system illustrated in FIG. 12, when a plurality of devices that independently perform user management exist within the system, log information that can be extracted with respect to a particular user can be generated with a simple system configuration.

Further, the present invention is also realized by executing the following processing. More specifically, a software (program) that realizes the above-described functions of the exemplary embodiments is supplied to a system or an apparatus via a network or various types of storage media, and a computer (or a CPU or a micro processing unit (MPU)) of the system or apparatus reads and executes the program. In this case, the program and the storage medium, which stores the program, constitute the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-211351 filed Sep. 14, 2009, which is hereby incorporated by reference herein in its entirety.

What is claimed is:

1. A management apparatus configured to manage log information related to a process in a first information processing apparatus and a second information processing apparatus operating in cooperation with each other, the management apparatus comprising:
a reception unit configured to receive first log information associated with a first user managed by the first information processing apparatus and second log information associated with a second user managed by the second information processing apparatus from the first and second information processing apparatuses, respectively, which independently perform user management, wherein the first log information includes authentication log information and job log information and the second log information includes job log information;
a replacing unit configured to replace information related to the second user in the job log information included in the second log information with information related to the first user in response to the first user corresponding to the second user based on the authentication log information included in the first log information;
a mergence unit configured to merge the job log information included in the first log information and the job log information after replacing the information by the replacing unit;
wherein the job log information includes a log indicating a FAX job; and
a log management unit configured to manage third log information generated on merging the job log information by the mergence unit.

2. The management apparatus according to claim 1, further comprising:
a dividing unit configured to divide the authentication log information included in the first log information by using device information of a cooperation destination and information related to a user for user management performed by the cooperation destination included in the authentication log information; and
a determination unit configured to determine whether the first user corresponds to the second user by using information related to a user for user management performed by the first information processing apparatus included in the divided authentication log information by the dividing unit,
wherein the replacing unit replaces the information related to the second user in the job log information included in the second log information with the information related to the first user in response to the determination unit determining that the first user corresponds to the second user.

3. The management apparatus according to claim 2, wherein the determination unit further determines whether the first user corresponds to the second user by using time information included in the divided authentication log information by the dividing unit.

4. A computer-implemented method in a management apparatus configured to manage log information related to a process in a first information processing apparatus and a second information processing apparatus operating in cooperation with each other, the method comprising:
receiving first log information associated with a first user managed by the first information processing apparatus and second log information associated with a second user managed by the second information processing apparatus from the first and second information processing apparatuses, respectively, which independently perform user management, wherein the first log information includes authentication log information and job log information and the second log information includes job log information;
replacing information related to the second user in the job log information included in the second log information with information related to the first user in response to the first user corresponding to the second user based on the authentication log information included in the first log information;
merging the job log information included in the first log information and the job log information after replacing the information;
wherein the job log information includes a log indicating a FAX job; and
managing third log information generated on merging the job log information.

5. The method according to claim 4, further comprising:
dividing the authentication log information included in the first log information by using device information of a cooperation destination and information related to a user for user management performed by the cooperation destination included in the authentication log information; and
determining whether the first user corresponds to the second user by using information related to a user for user management performed by the first information processing apparatus included in the divided authentication log information,
wherein replacing includes replacing the information related to the second user in the job log information included in the second log information with the information related to the first user in response to determining that the first user corresponds to the second user.

6. The method according to claim 5, wherein determining further includes determining whether the first user corresponds to the second user by using time information included in the divided authentication log information.

7. A non-transitory computer-readable storage medium storing a computer program for causing a computer to execute the computer-implemented method according to claim 4.

8. The non-transitory computer-readable storage medium according to claim 7, further comprising:

dividing the authentication log information included in the first log information by using device information of a cooperation destination and information related to a user for user management performed by the cooperation destination included in the authentication log information; and determining whether the first user corresponds to the second user by using information related to a user for user management performed by the first information processing apparatus included in the divided authentication log information, wherein replacing includes replacing the information related to the second user in the job log information included in the second log information with the information related to the first user in response to determining that the first user corresponds to the second user.

9. The non-transitory computer-readable storage medium according to claim 8, wherein determining further includes determining whether the first user corresponds to the second user by using time information included in the divided authentication log information.

* * * * *